United States Patent [19]

Pinede et al.

[11] 3,786,194

[45] Jan. 15, 1974

[54] TELEPHONE SYSTEM EMPLOYING ELECTRONIC MATRIX

[75] Inventors: Edouard Pinede; John Anthony Barsellotti; Frederico Riccardo Laliccia, all of Guelph, Ontario, Canada

[73] Assignee: International Standard Electric Corporation, New York, N.Y.

[22] Filed: June 4, 1971

[21] Appl. No.: 149,960

[52] U.S. Cl....... 179/18 AD, 179/18 AB, 179/18 GF

[51] Int. Cl. ........................................... H04q 1/52

[58] Field of Search.................... 179/18 GF, 18 AD, 179/18 E, 99, 42, 27 CA, 18 FA, 18 FG, 18 AB

[56] References Cited

UNITED STATES PATENTS

| | | | |
|---|---|---|---|
| 3,688,051 | 8/1972 | Aagaard | 179/18 GF |
| 3,666,892 | 5/1972 | Hestad | 179/18 GF X |
| 3,491,209 | 1/1970 | Relsted | 179/18 GF |
| 3,400,224 | 9/1968 | Heitmann | 179/18 GF |
| 3,573,383 | 4/1971 | Lauwers et al. | 179/18 GF X |
| 3,550,088 | 12/1970 | Jones | 179/18 GF X |
| 3,489,856 | 1/1970 | Brightman | 179/18 GF |
| 3,204,038 | 8/1965 | Seemann et al. | 179/18 GF |
| 3,118,973 | 1/1964 | Kasper et al. | 179/18 GF |
| 2,907,832 | 10/1959 | Boswau et al. | 179/22 |

*Primary Examiner*—Thomas W. Brown
*Attorney*—C. Cornell Remsen, Jr., James B. Raden and Marvin M. Chaban

[57] ABSTRACT

A common control, multi-station, multi-conversation path intercom system using a single stage, crosspoint matrix for effecting the switching between stations. Two digit dialling, either multifrequency tone or dial pulse is used to control the switching to a called party. Each station line circuit has a talking potential supply and a current control network. The conversation link circuit provides a choke coil isolating talking currents from the talking battery. Each matrix crosspoint has a plural transistor network for performing its switching through function.

12 Claims, 10 Drawing Figures

INVENTORS
EDOUARD PINEDE
JOHN A. BARSELLOTTI
FEDERICO LALICCIA
BY Marvin Chaban

LINK CIRCUIT

LINE CIRCUIT

TELEPHONE SYSTEM EMPLOYING ELECTRONIC MATRIX

BACKGROUND OF THE INVENTION

In the prior art most intercommunication systems or key telephone systems have provided one or two common converstaion paths with no secrecy, or have been merely small versions of complex central office exchangers. Electro-mechanical components have comprised the dominant switching element. In the more recent art, time division multiplexing has been used to provide an extremely complex switching control for an intercom system.

SUMMARY OF THE INVENTION

The present invention produces a system with a plurality of private talking paths controlled through a common control with a single stage, electronic crosspoint switching matrix.

It is therefore an object of the invention to provide a new and improved electronic multi-station intercommunication system. In this regard, a specific object is to provide a single, single-stage switching matrix operative both for finding the calling station and for switching through to the called station.

It is a further object of the invention to provide an improved control network for the conversation path of a small telephone intercommunication system.

It is a still further object of the invention to provide a telephone system, wherein a controlled source of talking potential is operatively associated with each station in a conversation path, and to provide supervisory functions attuned to these talking potential sources.

It is another object of the invention to provide new and improved electronic controls for a small multi-station telephone intercommunication system.

These and other objects, features and advantages of the invention will become apparent from the detailed description to follow taken in conjunction with the accompanying drawings.

BRIEF DESCRIPTION OF THE DRAWINGS

FIGS. 2*a* and 2*b* jointly form a schematic diagram of the common control circuit of FIG. 2, FIG. 2*a* being configured to be positioned directly to the left of FIG. 2*b;*

Figure 1:
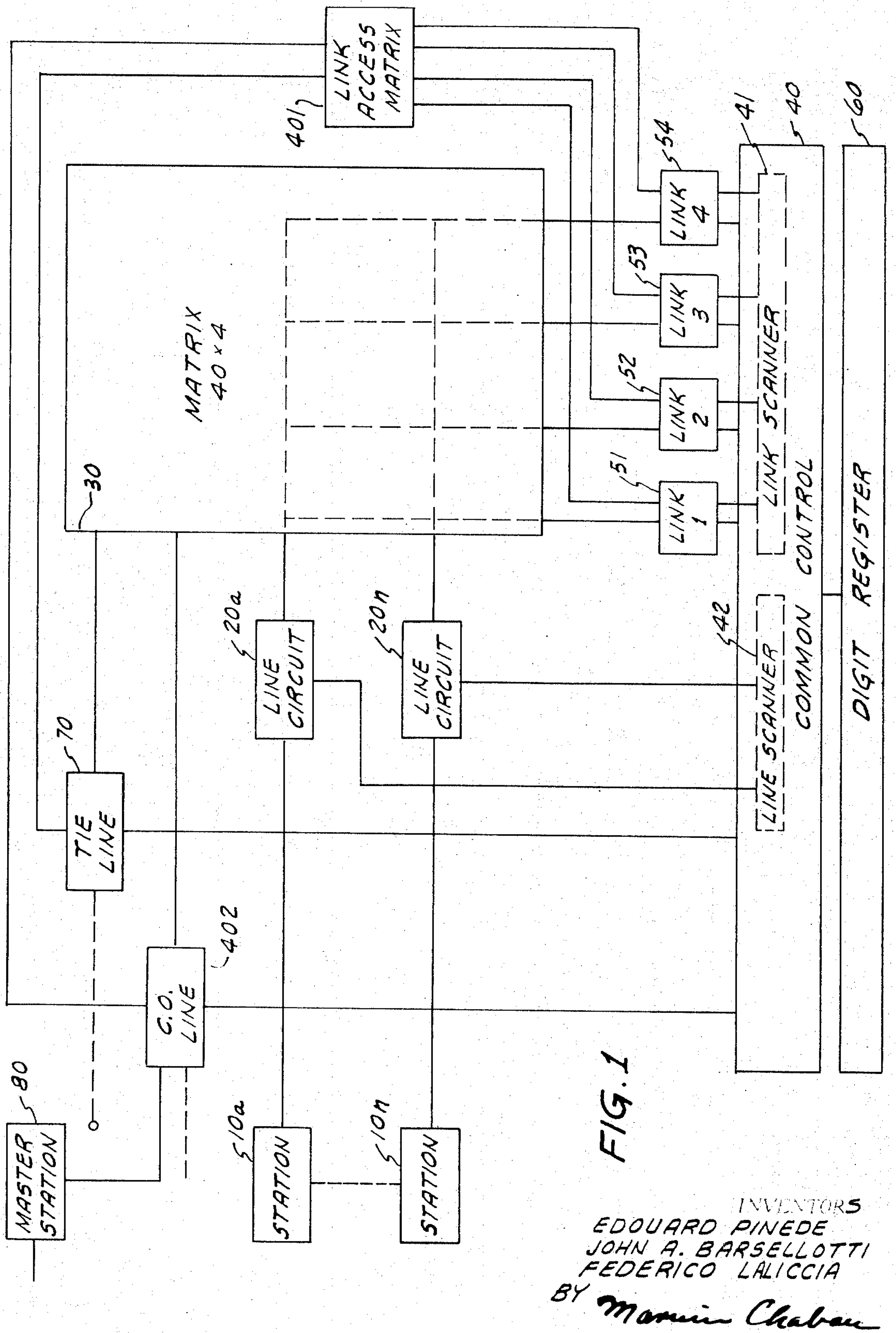
FIG. 1 is a schematic block circuit diagram of a telephone intercommunication system employing the invention.

A simple block diagram of a system employing the inventive principles is shown in FIG. 1. The system of FIG. 1 is designed for up to 36 local stations and up to four conversation links. Numbering of the stations may be as follows in one exemplary form: 22–20, 32–30, 42–40, and 52–50. Some stations are only allowed to make calls within the intercom system while others have access to a central office exchange.

Within the system, the intercom stations designated generally by the numerals 10a-n each have a conventional station instrument connected to its respective line circuits, the line circuits being designated by numerals 20*a–n*. The line circuits provide interface with the matrix 30 through its horizontal multiples, and are controlled both by signals generated by the common control circuits 40 and by the respective station instruments.

A general description of the operation of the system is described with respect to FIG. 1 as follows:

When power is first applied to the system, or any time a selected one of the four available links 51-54 becomes busy, a link scanner 41 in the common control 40 scans until a free link is found. When a free link is found to be available, the vertical multiple corresponding to the free link is determined and subsequently marked to ready the system for processing a call.

When a station initiates a call by going off-hook, all intercom station lamps (not shown) illuminate. A signal on one lead from the calling station enables a line scanner 42 in the common control, which scans until the calling station's line is located. When the calling line has been located and marked on the corresponding matrix horizontal multiple, the matrix 30 crosspoint correspoiding to the calling station and the link being used is switched connecting the calling station to the link being used. Dial tone, from the common control, is returned to the calling station through the matrix connection and the respective line circuit to indicate the system is ready to receive dial information.

By either multi-frequency tones or dial pulses from the calling station, two digits are applied to receiver or register 60 by way of the calling station line circuit, the matrix, the link being used and the common control circuits. The register decodes the tones, or counts the dial pulses. The called station number is applied to the line circuits via the common control circuits. The line scanner 42 of the called station is enabled, and the matrix crosspoint associated with the called line being used switches to connect the calling station to the called station. Ringing and lamp flashing signals are applied to the called station via its line circuit. Busy or ring tone is returned to the calling station via the link circuit being used. All intercom lamps are extinguished except those at the calling and called stations.

When the called station answers, the ringing and lamp flashing signals are removed and communication is established between the two stations.

The link circuit which is being used for this call disengages from the common control and the link scanner scans to a free link, to await the next call. The link circuit being used by the call in process remains active to provide call supervision and to release the matrix connections when the call is complete.

When a call is over, the intercom stations go onhook, both intercom lamps extinguish, and the intercom circuitry is returned to the idle condition.

The line transfer circuit 70 to the Central Office is required when certain stations are not given access to the Central Office directly but require master station transfer. To effect this result, all Central Office lines from the respective lines circuits are connected to the line tranfer circuit 70 and a master station 80, as well as to the other telephone stations having direct access to the Central Office.

When the master station wishes to transfer a Central Office line to an intercom station not normally having access to that Central Office line, the master station first puts the Central Office line requiring transfer on hold. The master station then dials the intercom station required, via the Central Office line transfer and the 36 station internal intercom circuitry. When the called station answers, the master station transfers the held Central Office line to the intercom station, via the Central Office line transfer and 36 station intercom circuitry. The intercom station may then communicate on the Central Office line. When the call is finished, the intercom station goes on-hook and the circuitry is returned to the idle condition. The functioning of the components necessary for calls into and out of the system are not within the scope of this invention and have only been discussed briefly to provide a better understanding of the environment of the invention.

The circuits for completing a local call through the system will now be explained in greater detail by tracing through the circuits to complete the steps in a calling sequence.

Figure 2A:
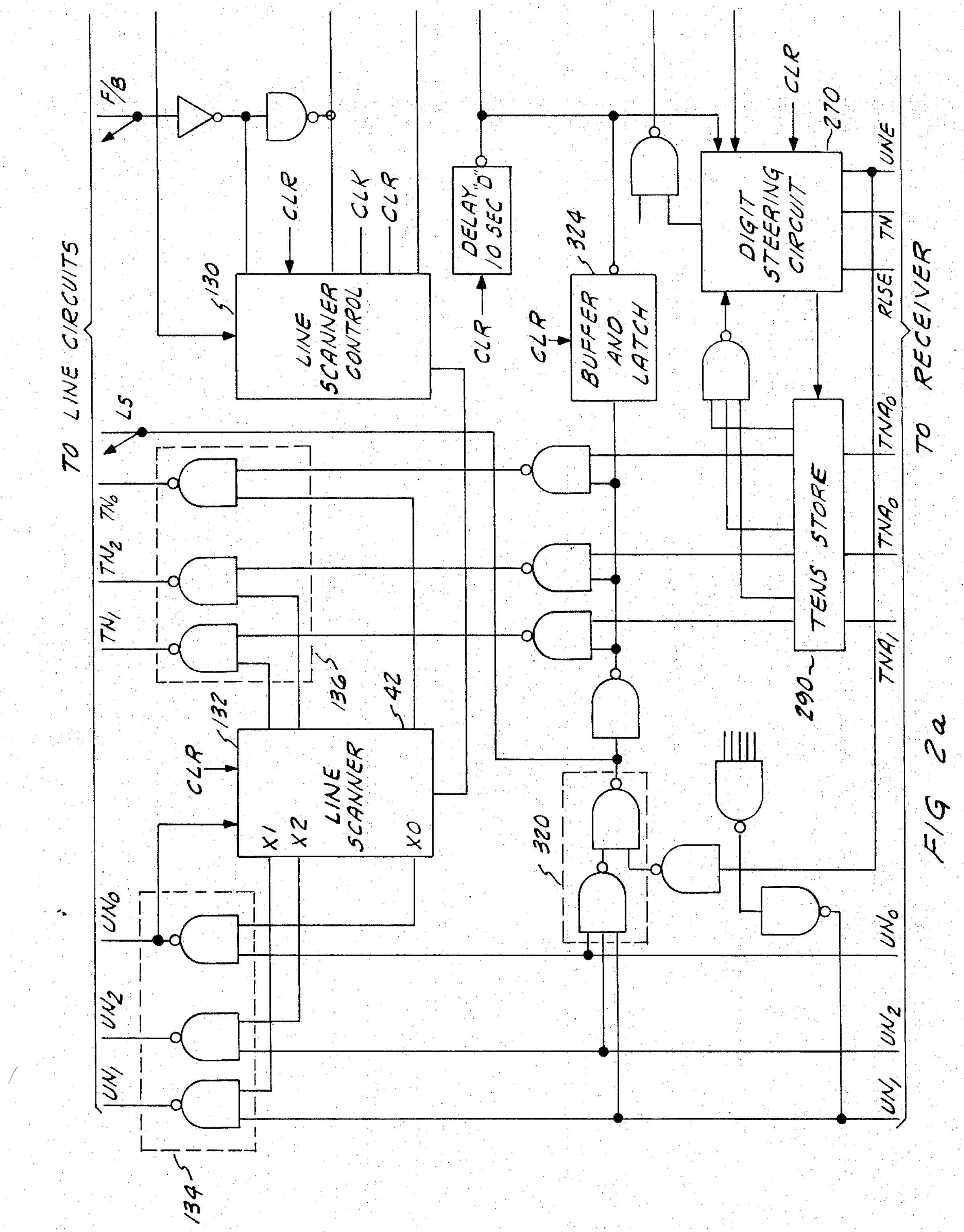
Figure 2C:
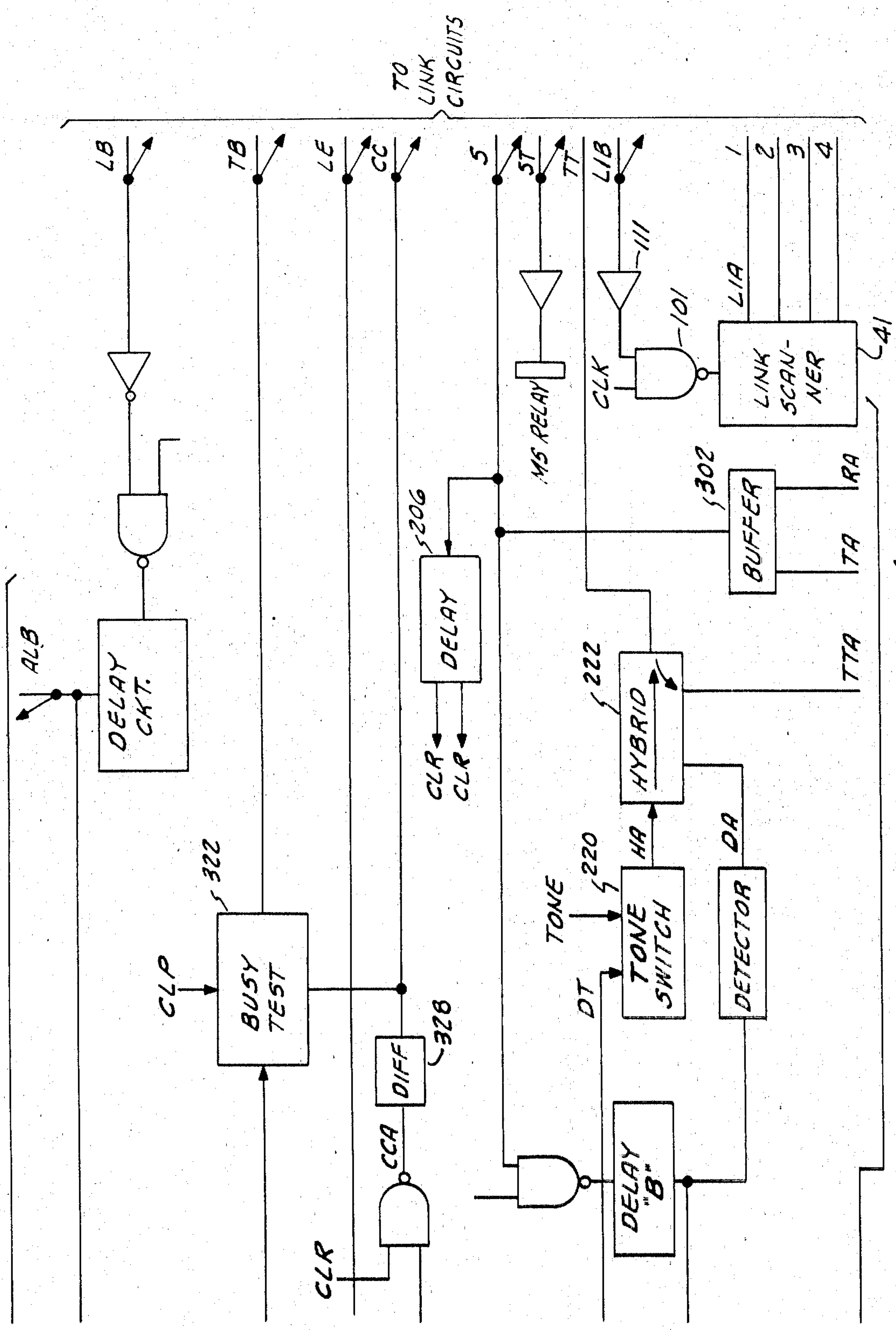
FIG. 2*c* is a schematic drawing of a receiver or register circuit as used herein and confined to be positioned below FIG. 2*a;*
Figure 2C:
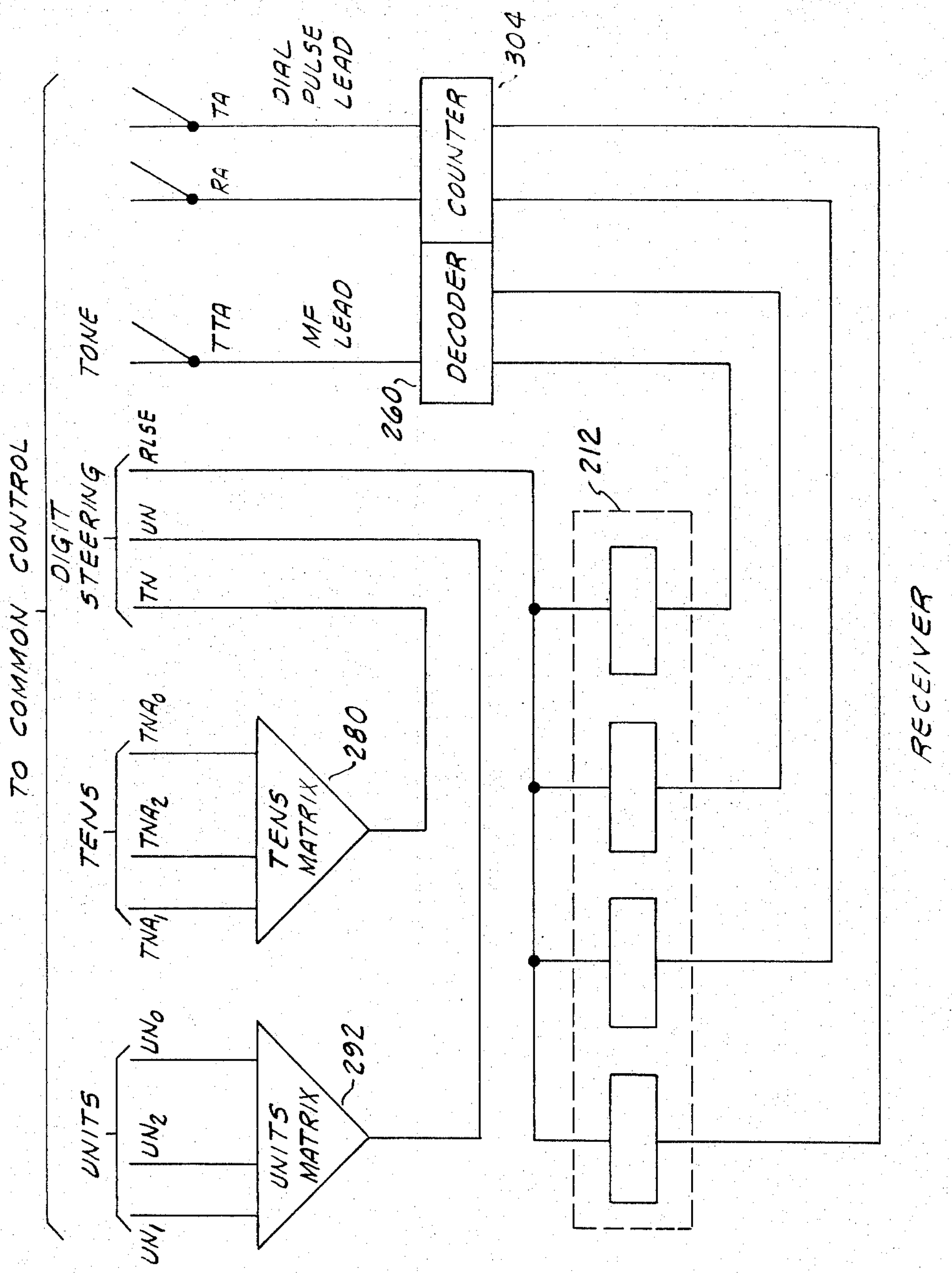
Figure 3:
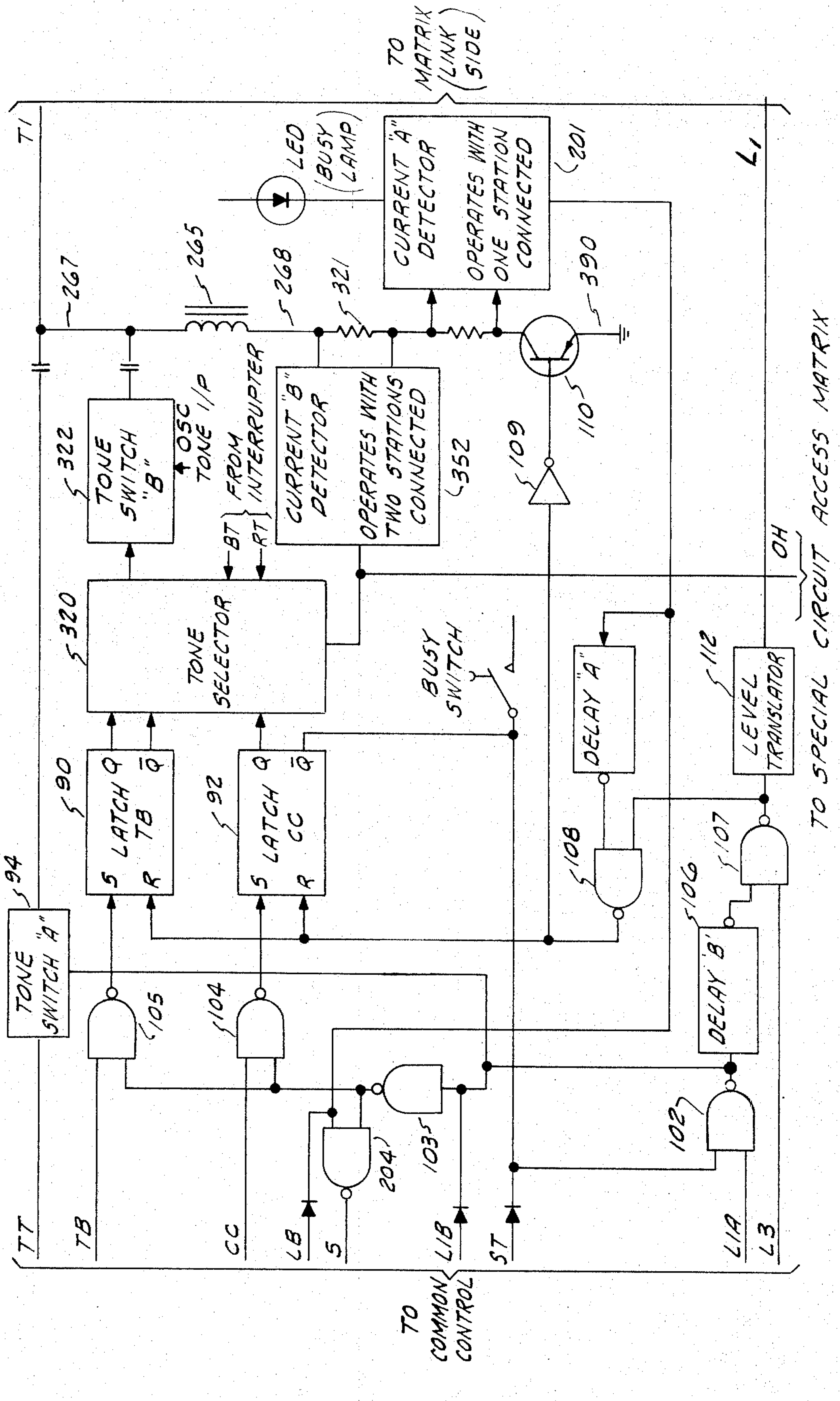
FIG. 3 is a schematic diagram of a typical link circuit as used herein.

As a starting point it will be assumed that power has just been applied to the system. At that time a free link (assumed to be link 51 as shown in detail in FIG. 3) will be selected by the common control (FIG. 2b). A clock pulse on lead CLK will trigger inverter gate 101 to produce a pulse on lead LIA-1. This pulse will be transmitted to link 51 (assumed to be connected to lead LIA-1, each of the leads LIA 1-4 being connected respectively to a different one of the links 51-54). The LIA-1 pulse is returned to the common control, to stop the link scanner if the link is free, via gate 102 and lead LIB. Additionally, the LIA-1 pulse will pass through inverter gates 102 and 103 to prepare gates 104, 105 and 204 in the link circuit, and will actuate tone switch 94 in preparation for initiation of a call. Furthermore, pulse LIA-1 passes through delay 106 and prepares gate 107. The purpose of delay 106 is to insure proper release of the link before reuse. To process a call, the LIA signal in conjunction with signal L3 will pass through gate 107 and 108, 109 to the base of transistor 110. This transistor 110 will conduct to place ground on the T lead to the matrix. Also, the signals LIA-1 and L3 after passing through gate 107 will be transmitted through the level translator 112 lead L1 to the proper matrix vertical multiple to mark link 51 as ready for use. The link 51 will remain is this marked condition until the matrix is switched.

Figure 4A:
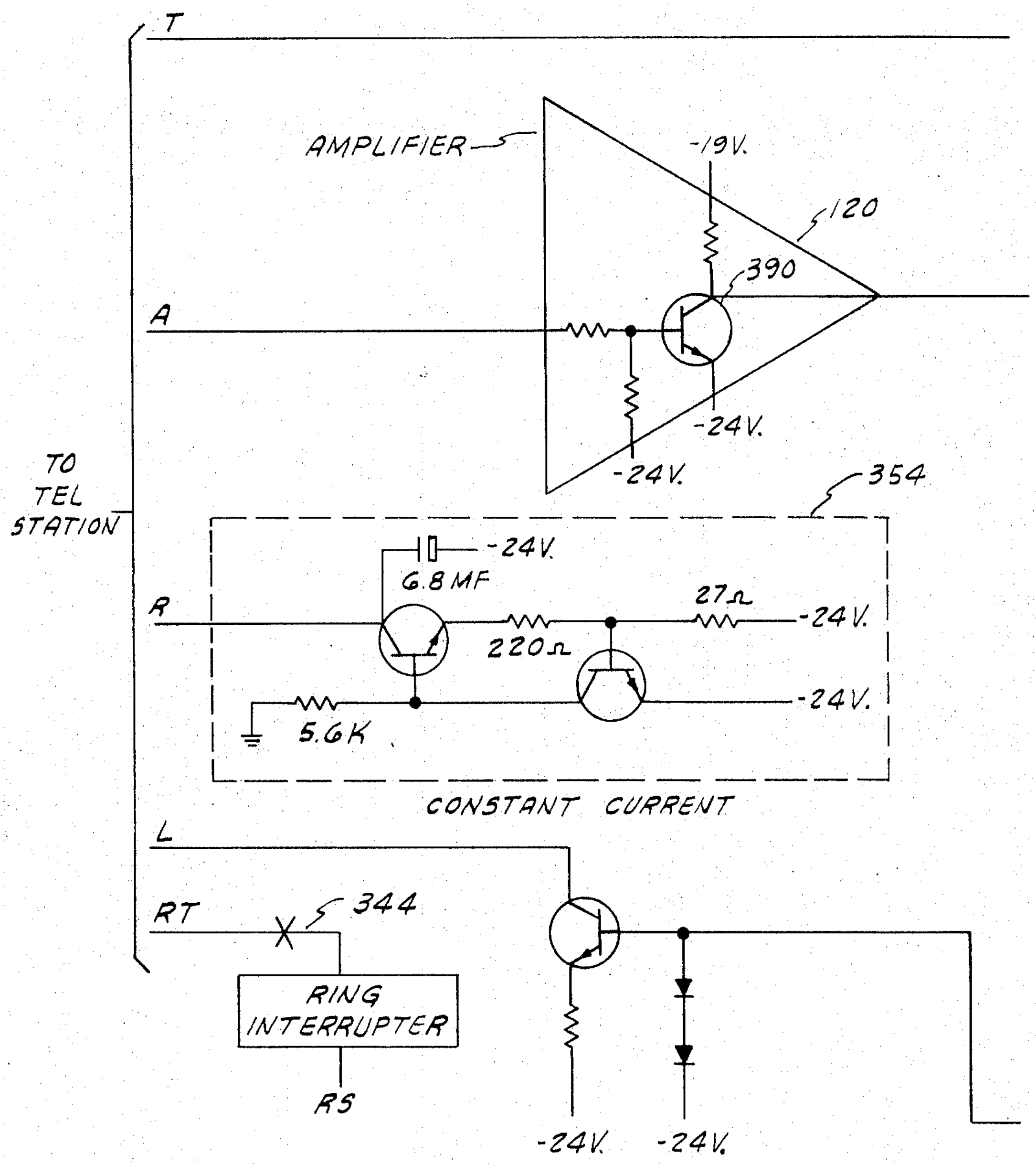
FIG. 4 shows the alignment of FIGS. 4*a* and 4*b* so that these figures when joined together form a schematic circuit diagram of a typical line circuit as used herein.
Figure 4:
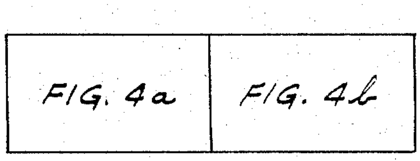
Figure 4B:
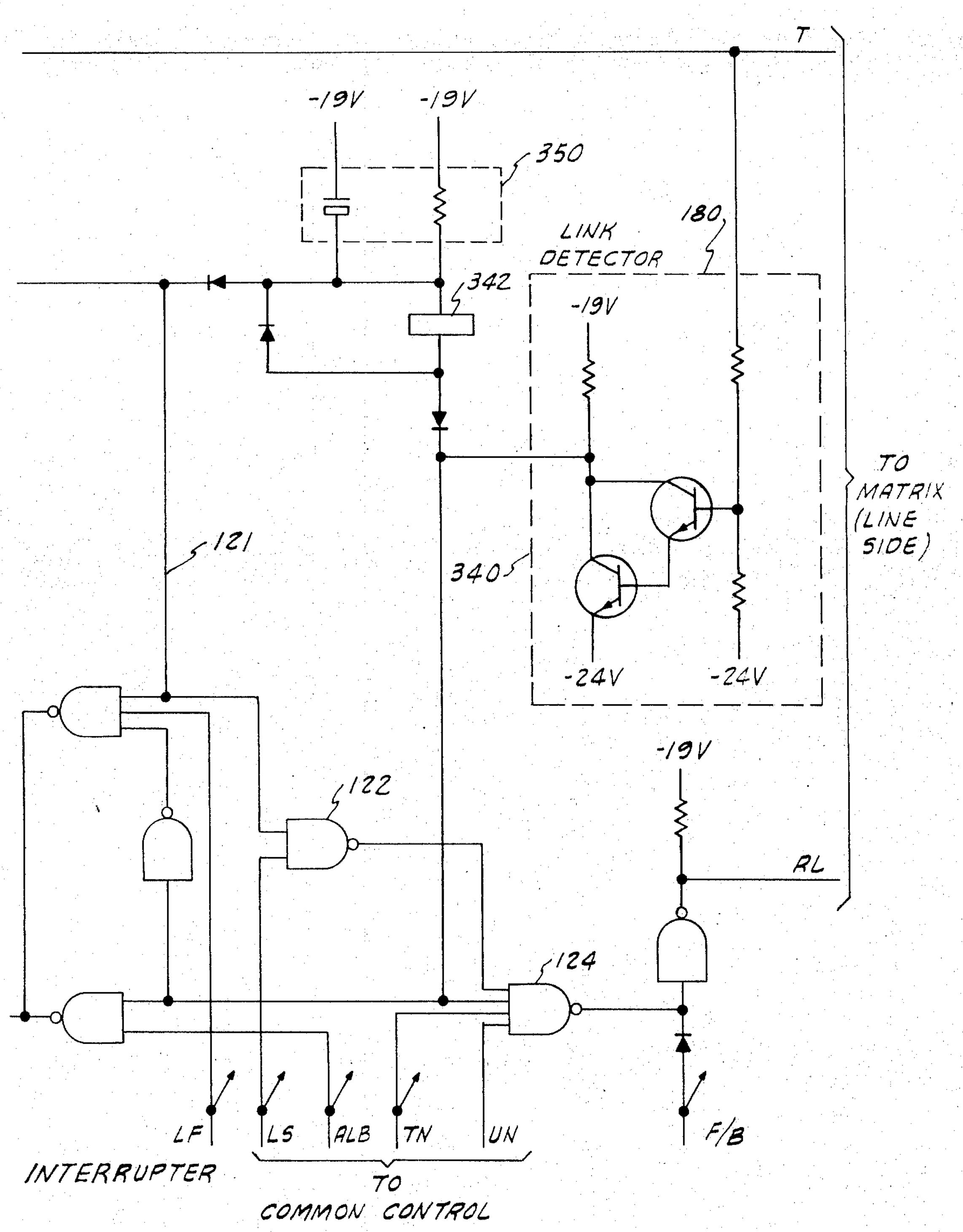

When a call is initiated, the calling station (assumed to be station No. 22) lifts his handset (goes off-hook) to close a circuit and transmit a signal to the A lead of the line circuit (FIG. 4) individual to that station. The signal is amplified by amplifier 120 and is transmitted over lead 121 to gate 122 to line scanner gate 124. A signal is thereby transmitted from the line circuit on FB lead to the line scanner control 130 in the common control to terminate scan of the line scanner 132 through the units scanning gates 134 and the tens scanning gates 136 when the signals on scanning leads UN1 – UN0 and TN1 – TN0 both reach the line circuit of the calline line. Such electronic scan action is generally known in the art.

The combined signal generated by the coincidence of the scanned gated signals from both the units and tens scan leads when combined with the signal from amplifier 120 causes a signal to be transmitted from the RL lead in the line circuit of the calling line to the particular matrix horizontal multiple. The matrix having an end marking representative of a calling line 22 on its horizontal multiple and a link marking link 51 on its vertical multiple causes a switching through of a matrix crosspoint.

Each matrix crosspoint is comprised of a two transistor network arranged for complementary flip-flop operation. As shown best in FIG. 5, each matrix crosspoint includes a first transistor referred to generically by the numeral 150 which is enabled by the seized link to switch on a second transistor referred to by the numeral 152 which is normally inoperative. The network has two isolation diodes 154 and 156, a separate biasing resistor 158 and 160 for each transistor, anticrosstalk resistors 162 and 164, and an isolation resistor 161. The combination signal on the RL lead and the L2 lead to crosspoint CP 22–1 represents the calling line numbered 22 and first link (link 51). Switching through of the matrix is effected by transistors 150 and 152 becoming conductive as will be explained in greater detail later in this explanation. On conduction, transistor 150 switches the T lead to the T1 lead through the isloation diode 154. With transistor 150 and transistor 152 conductive and by the action of the line circuit link detector 180 sensing the condition of the T lead from the matrix crosspoint indicating a seized link and a calling line, the line scanner gate 124 in the calling station line circuit is rendered ineffective. At this time, the current detector 201 in the link circuit being used detects current of at least 20 milliamperes from the closed circuit at the calling station to cause a signal to pass through gate 204 (in the link circuit) to lead S and through a delay network 206 in the common control to generate a CLR signal. This signal fed to the line scanner control 130 causes the line scanner to be disabled until completion of a call.

At this time the calling station assumed to be 22 (tens digit 2 and units digit 2) is now connected to link 51 and through this link to the common control 40 and the receiver 60. Link detector 180 in the line circuit senses the ground received from the link to genrate a line scanner disable signal to mark a line as busy. Dial tone is transmitted from tone switch 220 in the common control, through hybrid 222 and lead TT to tone switch 94 in the link and lead T1 through the matrix to the calling line. The calling station is thereby made aware of the readiness of the system for dialling information.

Dial pulses or multi-frequency tones are generated at the calling station in either known fashion. In the case of multi-frequqncy tones, signals are generated and transmitted over the T lead through the line circuit and matrix crosspoint to the link circuit and through tone switch 94 to lead TT and the hybrid circuit 222 in the common control and lead TTA to the decoder 260 and decoding relays 212 in the receiver or digit register 60. Choke coil 265 in the lead 267 filters the tones received on lead 267 and prevents passage of these tones to lead 268 for reasons which will be explained later. The receiver decodes the tens digit. Two separate matrices (shown symbolically as triangle 280 for the tens digits and 292 for the units digits) in the receiver 60 are prepared for digit storage. The digit steering circuit 270 in the common control will apply a pulse on the input lead TNE of the tens matrix 280 in the receiver. The pulse will appear on the output corresponding to the digit dialled and will be transferred into the tens store 290 in the common control.

When the tens digit has been registered in the tens digit store 290, the digit steering circuit 270 will apply a release signal on RLSE lead to release the receiver, and will discontinue dial tone from the calling station. The calling station then dials in the units digit over a similar path which the steering circuit forwards to units matrix 292 in the receiver. A pulse is applied to the proper lead which the units matrix 292 transmits to the proper common control units gate corresponding to the units digit signalled.

Where dial pulses are used in place of multi-frequency tones, the operation of the receiver and common control is identical to that described. However, within the link circuit, interrupted d.c. pulses pass through choke coil 265 to lead 268 and current detector 201 and gate 204 to the S lead, and buffer 302 and lead TA to the dial pulse counter 304 in the receiver. The tens digit once counted is stored as described previously, and the units digit passes through the respective units gate.

As mentioned previously, in either event, the tens digit called is stored within tens digit store 290, and the units digit is passed by the respective units gate and to the line scanner gates of line circuits corresponding to the units digit of the called station.

The units digit having been transmitted to the line scanners of the line circuits representing stations the same units digit as the called station, a signal is returned on the lead to buffer and latch circuits 324 in common control 40 to enable the read out of tens digit store 290 through the digit steering gate circuits 270. This circuit causes the tens digit signal dialled to be read out and transmitted to the line scanner gates 124 of line circuits having a tens digit common to the called station.

Further, the units pulse causes a line select signal to be transmitted to all line scanner gates of line circuits representative of stations having the called units digit. A call complete pulse is generated by the units digit signal through buffer and latch circuit 324 of the common control and lead CC to the link. Within the link circuit, the call complete pulse enables the tone select circuit 320 and is stored awaiting the full marking of the called station.

Figure 5:
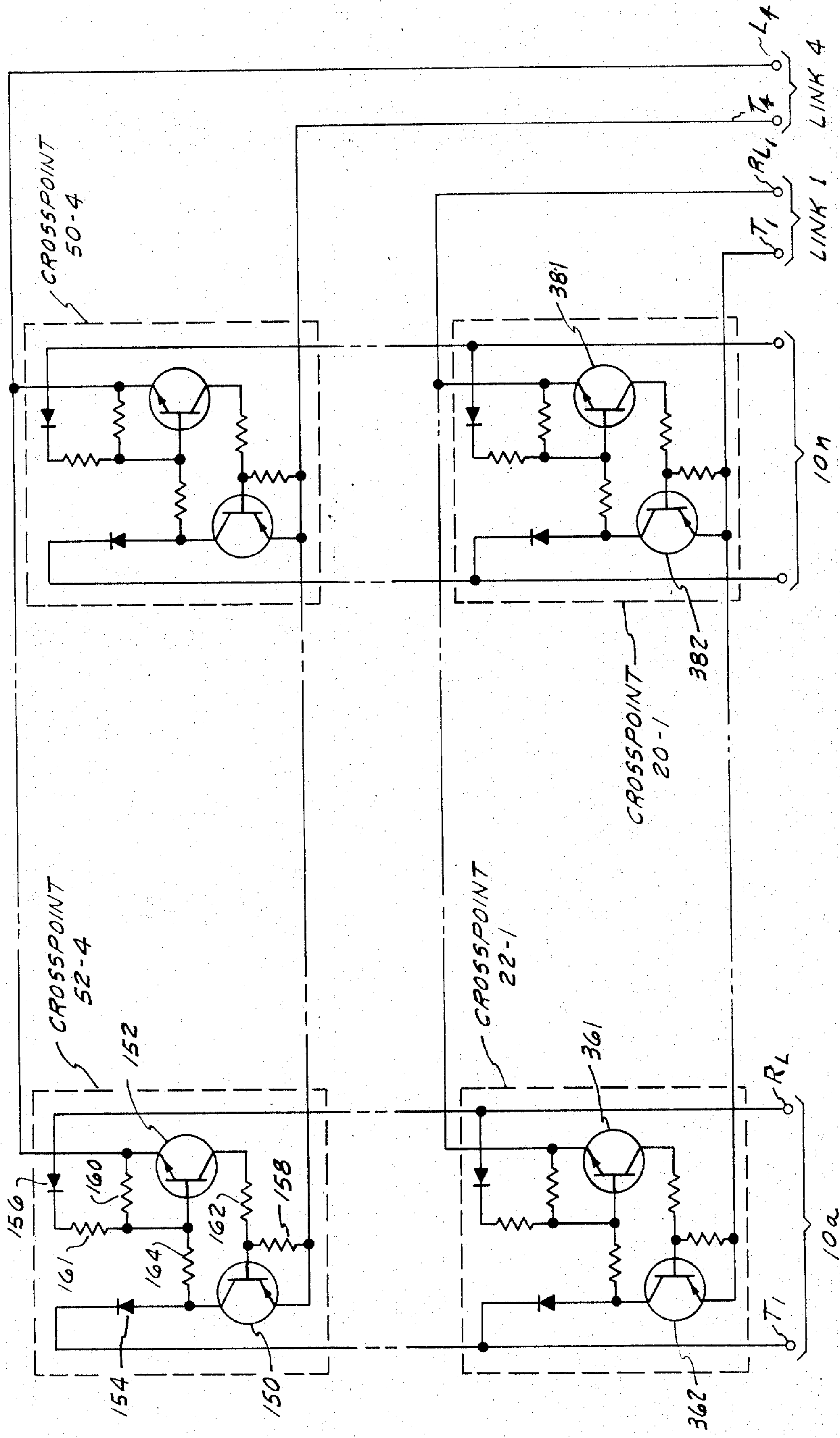
FIG. 5 is a detailed drawing of the electronic matrix used herein with one or more crosspoints shown in detail.
Figure 6:
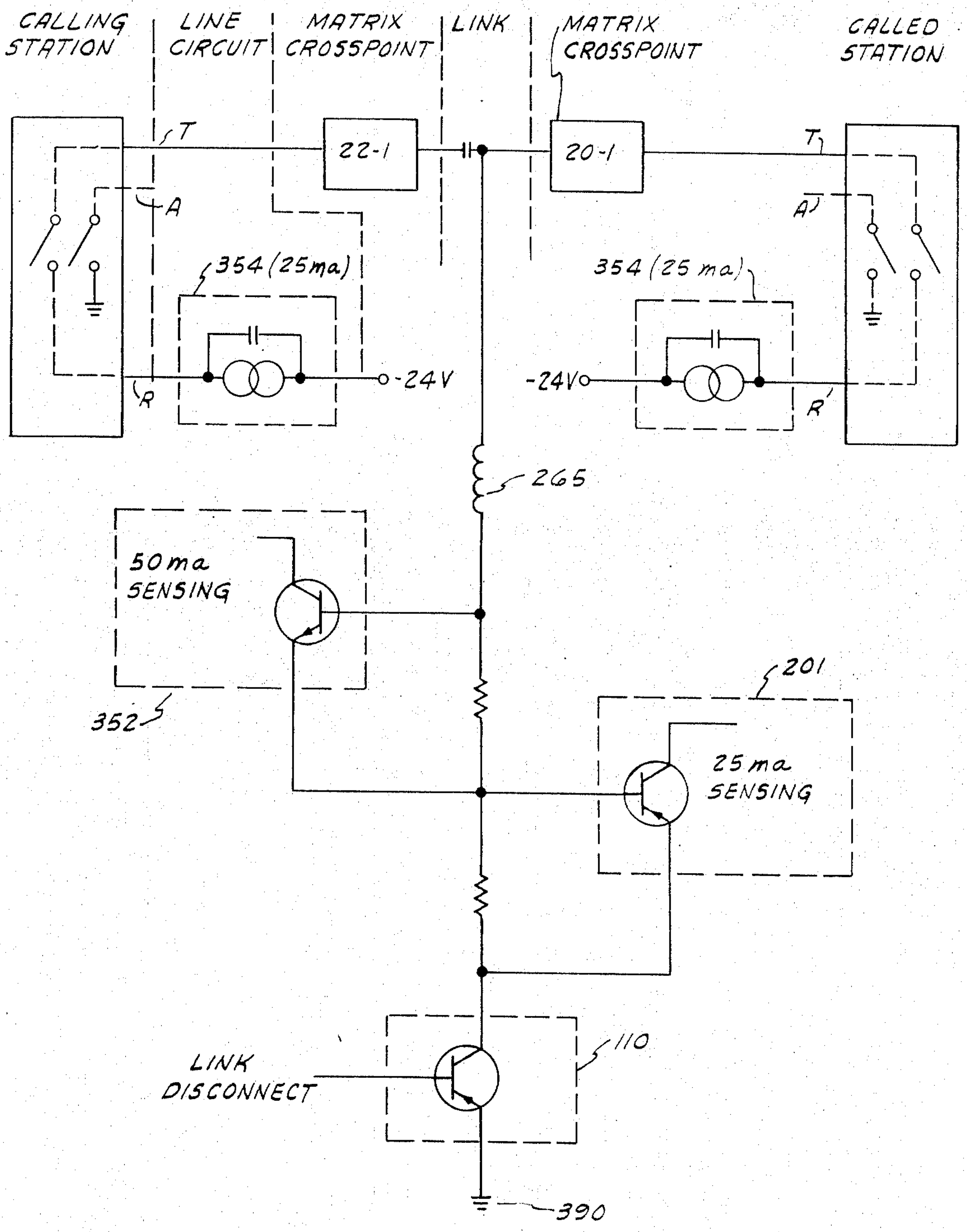
FIG. 6 is a simplified schematic circuit diagram of a typical speech path through the system.

At this time, the line scanner gate 124 of the line circuit serving a called station, assumed to be station 20 represented by crosspoint 20-1 of FIG. 5, will have received a line select pulse, a units digit pulse and a tens digit pulse. Naturally only the line circuit of the called station will have received all three signals and only the called station will have the output voltage of its line scanner gate 124 sufficiently elevated to switch the corresponding matrix crosspoint, as will be explained more fully.

The full output of the line scanner gate 124 of an idle station returns a signal on the FB lead to initiate a busy test over lead TB to the link circuit. As mentioned previously, a line circuit in use in a call (off-hook) will have a busy signal impressed on lead 121 to gate 122 marking the line circuit as busy. This signal is passed through the busy test latch circuit 90 and is stored. When only a call complete signal is received by the link, a signal is sent on the LIB lead from the link being used. This signal removes the link scan stop signal to start the link scanner on its scan to find the next idle link and to connect it to the common control awaiting the next call.

Within the link in use, the call control pulse on lead CC turns on the tone switch 322 via gate 104, latch 92 and tone selector 320 if the called station tests free. Tone selector 320 in this condition will pass back ringing tone to the calling line. To generate ringing current to the called line, link selector 180 in the line circuit of the called line senses the voltage on lead T from the matrix. If the voltage indicates that matrix crosspoint individual to the called station has switched to connect the called line circuit to the link in use, but the subscriber station circuit is not closed, relay 342 in the line circuit is operated, closing its contacts 344 to place ringing current on RT lead to the subscriber ringing equipment. A signal is transmitted through the line scanner gate and lead FB to the TB lead and latch 90 in the link circuit. When a CC signal from call complete latch 92 coincides with a TB signal from busy test latch 90, a busy tone is sent to the calling line.

Assuming that the called station is not busy, ringing tone generated due to the CC pulse alone is sent through tone selector 320 and tone switch 322 to lead 267 to the called and calling parties. This tone continues until either the calling party hangs up, or until the called party answers. When the called party answers, current detector 352 in the link senses the added off-hook station current to shut off the ring tone to the calling station. The −24 volt from the answering station cuts off relay 342 to terminate the ringing. The called and calling stations are in the open voice communication over the T lead and communication continues.

With the call in progress, the converstation path is complete over a path from the −24 volt source at the calling line circuit through the current control circuit 354 and lead R to the calling station line and back over the T lead through the calling connection at the calling matrix crosspoint to the link circuit and back through the called matrix crosspoint to the called station lead T and the station lead R to the called line circuit current control circuit 354 to −24 volt source.

A ground connection within the link through conducting transistor 110 provides a choke coil filter 265 and supervisory function controls 201 and 352 to the conversation path. Note that transistor 110 is rendered conductive on seizure of the link circuit and remains in its conductive state as long as the link circuit is in use.

A matrix crosspoint, an example of which is shown in FIG. 5 operates in the following manner: In the first instance during scanning for an idle line, an available link is connected to the vertical crosspoint multiple awaiting a calling station seeking service.

When an idle link is seized, ground at the seized link is transmitted through transistor 110, resistors 323 and 321, and choke coil 265 in the link circuit 51 (assuming that the first link, link 51, is available for use) as determined by the link scan previously discussed. This ground is transmitted to the T1 lead of matrix vertical multiple. When a party initiates a call by going off-hook, a −24 volt source is connected to the T lead of the subscriber station and is transmitted over the line circuit T lead to the horizontal multiple of the calling station. When this signal is joined by a less negative signal on the line circuit RL lead of the calling station, the combined signal indicates that the calling station has been found. This combined signal is transmitted to the selected matrix horizontal multiple lead to actuate the matrix crosspoint for the seized link and the calling station.

The less negative signal on the RL lead to the crosspoint biases transistor 361 into conduction provided lead L1 is marked by the selected link (link 51, in this case). Lead RL having been biased less negatively causes the transistor 361 to conduct. Conduction of this transistor 361 biases transistor 362 into conduction also. Transistor 362 on conduction switches the crosspoint to complete the connection from the calling line to the link.

Conduction of transistor 362 biases the base of transistor 361 more positively causing transistor 361 to latch independent of signals on leads RL and L1 and placing the crosspoint transistor 362 under the control of the link and ultimately under the control of the line.

A matrix crosspoint is also involved in the selection of the called line. At that time, the link being used for completing calls is connected to the matrix vertical multiple. When the line scanner gate in the line circuit of the called station is reached and the line circuit called is marked as idle, a less negative signal is transmitted from the line circuit of the called station to the matrix horizontal multiple. This bias change causes the transistor 381 at the matrix crosspoint on the multiple of the called station to conduct. Conduction of transistor 381 biases transistor 382 into conduction to switch through the crosspoint. Conduction of transistor 382 without the called station having switched through maintains both transistors conductive until the called line answers, placing −24 volts on lead T from the line circuit. This voltage indicating a completed call causes transistor 381 to latch in the same manner as described above with regard to transistor 361 in crosspoint 22-1.

If the called station does not answer, and the calling station hangs up, the crosspoint of the calling station restores. This restoration is effected by the calling station release. This release causes current detector 201 in the link circuit to initiate a release signal for transistor 110. Release of the transistor 110 removes the ground source from lead 267 and the T1 lead. Removal of the ground causes release of the operated transistors at both the calling and called matrix crosspoints.

When a station initiates a call, a grounded signal is placed on lead A to operate transistor 390 in amplifier 120. Operation of this transistor places negative voltage on lead 121. When this signal coincides with a signal from link detector 180 indicating that a link has been connected through the matrix to the calling line, the line finding operation is terminated. The signal on lead 121 inhibits the operation of the ring relay 342 so that the ring relay is not actuated.

Turning now to the line circuit of the called party, the first indication of the call to produce the line marking is the line scan induced by the digit storage and transmission. If the called line is not busy, the signals on leads TN and UN will cause an FB/B signal to pass to the link and mark the line side of the matrix to allow the matrix to switch. The line detector will generate a signal to cause relay 342 to operate and generate ringing pulses until the called party answers, shunting down the ring relay 342.

If however, the called station is busy, the negative signal on lead 121 from the A lead of the called station does not prevent the marking of the matrix horizontal multiple and switch through of the called line crosspoint but does inhibit ringing. Ring relay 342 cannot operate. A busy signal is generated to the calling party by the link circuit busy test and tone selector 320.

While speech path transmission is in effect, current from each line circuit is provided at a potential of −24 volts through its constant current network 354 comprising transistors 381 and 382. This network maintains the current fed to one conversing substation at 25 milliamps. Naturally, during a converstaion two networks, one at the calling station and one at the called station, each provide 25 ma to the conversation path. RC network 350 is present to prevent re-operation of relay 342 when called station hangs up at end of call.

The link access matrix 401, tie line 70, central office line 402, and master station shown in block form in FIG. 1 are all used generally in the transfer of calls from outside the intercom system to stations within the intercom network. These features are not involved in the present invention and need not be described herein to effect the claimed functions.

While there has been described what is at present thought to be the preferred embodiment of the invention, it is understood that modifications may be made therein, and it is intended to cover in the appended claims all such modifications which fall within the true spirit and scope of the invention.

We claim:

1. A telephone intercommunication system comprising a plurality of stations, a line circuit individual to each station, a conversation link circuit interposed between line circuits of a calling one and a called one of said stations to complete a conversation path between said stations through a switching network, a current source of like polarity individual to each line circuit, a ground connection intermediately within a completed conversation path, and commonly connected to both calling and called stations, means associated with each current source for providing a constant current output to said conversation path from each said source, and means for sensing the current from said sources to determine the idle or busy condition of stations connected to said conversation path.

2. A system as claimed in claim 1, wherein said ground connection includes a choke coil for filtering alternating currents from said ground connection, and there are direct current sensing means in said common ground connection for supervising said conversation path.

3. A system as claimed in claim 1, further comprising means in said link circuit responsive to a predetermined value of current received from both the calling and called stations for maintaining said conversation path intact, and further means in said link circuit for detecting current from only one of said stations to initiate the release of both the called and calling stations from said conversation path.

4. A multi-station telephone intercommunication system comprising a single-stage, switching matrix for finding a calling one of the stations and for connecting to a called one of the stations, said matrix comprising a plurality of intersecting bus multiples with an identical crosspoint at each multiple intersection, each of said busses of a first of said multiples representing one of said stations, each crosspoint including a first switching member responsive to a signal from the calling station represented by the bus of the calling station for switching a line from the calling station through said matrix to an intermediate member and each crosspoint including a second switching member for controlling the switching through of a path between said calling station and a called station during a ringing interval and for switching control of the connection to said first switching member on response of the called station, each said switching member comprising a transistor, and each crosspoint further including means for maintaining that crosspoint connected to a calling station and another crosspoint connected to a called station in a call completing condition, and means for detecting the release of said calling station to restore both crosspoints from the call completing condition.

5. A system as claimed in claim 4, wherein said first switching member has its emitter and collector connected to a speech path lead of said line, and each said second switching member is connected to a control lead of said line.

6. A telephone intercommunication system comprising a plurality of stations, a source of constant current of like polarity individual to each of said stations, a conversation link circuit interposed between a calling one and a called one of said stations to complete a conversation path between said stations, means in said link circuit responsive to the activation of said link circuit for completing a connection common to both stations in said conversation path, supervisory control means in said last-mentioned connection for sensing the amount of current from the stations connected to said conversation path for monitoring the idle or busy condition of the stations in the conversation path.

7. A system as claimed in claim 6, wherein said common connection includes a choke coil interposed between said conversation path and said supervisory means for isolating said sensing means from any alternating current received from said stations in the conversation path.

8. A system as claimed in claim 6, comprising means in said link circuit responsive to a predetermined value of current received from both the calling and called stations for maintaining said conversation path intact, and further means in said link circuit for detecting a predetermined value of current from only one of said stations to initiate the opening of said conversation path.

9. A telephone system comprising a single stage electronic matrix for completing calls from a calling station at one side of said matrix to a link circuit at the other side of said matrix, and from said link circuit to a called station at the one side of said matrix, said matrix comprising a plurality of crosspoints each having a connection to one of said stations and connectable to said link circuit, each said crosspoint comprising a first switching member, the invention comprising means for firing the first switching member of the cross-point connected to a calling station and said connected link circuit to initiate a connection from said calling station to said link circuit, and a second switching member in the crosspoint connected to said calling station, said second switching member responsive to a called station being idle for latching said crosspoint.

10. A system as claimed in claim 9, wherein there is means in said link circuit connected to said second switching member for controlling the maintenance of the latching of said crosspoint.

11. A system as claimed in claim 10, wherein the first switching member of the crosspoint connected to the called station is rendered conductive responsive to a call being directed to said called station, and the second switching member of the crosspoint connected to the called station responsive to the called station answering the call for latching said last mentioned crosspoint under the control of control means in said link circuit.

12. A system as claimed in claim 11, wherein said switching members of a crosspoint each comprise a transistor connected in complementary flip-flop arrangement.

* * * * *